(12) United States Patent
Coverston et al.

(10) Patent No.: US 9,569,435 B2
(45) Date of Patent: Feb. 14, 2017

(54) MINIMIZE DOWNTIME WITH IMMEDIATE UPGRADE OF DATA IN DATABASES

(71) Applicant: NAVITAIRE LLC, Minneapolis, MN (US)

(72) Inventors: Sam Jason Coverston, Alpine, UT (US); Jefferson Bridger Walsh, Sandy, UT (US)

(73) Assignee: NAVITAIRE LLC, Minneapolis, MN (US)

( * ) Notice: Subject to any disclaimer, the term of this patent is extended or adjusted under 35 U.S.C. 154(b) by 135 days.

(21) Appl. No.: 14/278,602

(22) Filed: May 15, 2014

(65) Prior Publication Data
US 2015/0331892 A1    Nov. 19, 2015

(51) Int. Cl.
*G06F 17/30*    (2006.01)

(52) U.S. Cl.
CPC ......... *G06F 17/30* (2013.01); *G06F 17/30297* (2013.01)

(58) Field of Classification Search
None
See application file for complete search history.

(56) References Cited

U.S. PATENT DOCUMENTS

| | | | |
|---|---|---|---|
| 8,775,477 B2 | 7/2014 | Coverston et al. | |
| 2002/0022982 A1 | 2/2002 | Cooperstone et al. | |
| 2002/0095397 A1 | 7/2002 | Koskas | |
| 2003/0004748 A1 | 1/2003 | Coleman et al. | |
| 2008/0066072 A1* | 3/2008 | Yurekli | G06Q 10/06 718/104 |
| 2009/0019061 A1 | 1/2009 | Scannell, Jr. | |
| 2011/0137859 A1 | 6/2011 | Dickman | |
| 2012/0109892 A1 | 5/2012 | Novik et al. | |
| 2012/0317150 A1* | 12/2012 | Coverston | G06Q 10/02 707/802 |
| 2014/0257887 A1 | 9/2014 | Coverston et al. | |

OTHER PUBLICATIONS

Sockut et al., "Online reorganization of databases," ACM Computing Services, vol. 4, No. 3, Jul. 2009, 136 pages.
Galante et al., "Temporal and versioning model for schema evolution in object-oriented databases," Data & Knowledge Engineering 52, May 2005, pp. 99-128.
Roddick, "A survey of schema versioning issues for database systems," Information and Software Technology, Elsevier Science B.V., vol. 37, No. 7, Jul. 1995, pp. 383-393.
Ferrandina et al., "Implementing Lazy Database Updates for an Object Database System," Proceeding of the 20th VLDB Conference, 1994 [retrieved online: http://www.vldb.org/conf/1994/P261.PDF], pp. 261-272.
International Search Report and Written Opinion, International Application No. PCT/EP2012/060799, mailed Aug. 19, 2013, 12 pages.

* cited by examiner

*Primary Examiner* — Anh Tai Tran
(74) *Attorney, Agent, or Firm* — Thompson Hine LLP (57) ABSTRACT

Methods, systems, and apparatus, including computer programs encoded on a computer storage medium, for updating data stored within the database. In some implementations, actions include providing a plurality of cut-off dates, for each cut-off date in the plurality of cut-off dates determining a total time based on respective times associated with a plurality of tasks to provide a plurality of total times, each total time corresponding to a respective cut-off date, selecting an actual cut-off date based on the plurality of total times, and updating data within the database using the actual cut-off date.

27 Claims, 9 Drawing Sheets

MINIMIZE DOWNTIME WITH IMMEDIATE UPGRADE OF DATA IN DATABASES

BACKGROUND

Databases are used by various organizations to manage large amounts of data. Generally, databases provide an organized mechanism for storing, managing and retrieving electronically stored data. Database tables include columns and rows that define cells that include associated data entries. In general, a cell includes an associated pointer that points to data stored in computer-readable memory that populates the cell.

In some instances, data stored within a database is to be upgraded. To perform the upgrade process, the database is taken offline, such that the data stored within the database is inaccessible to an organization's customers and even the organization itself. Further, the processes used to upgrade the data can result in errors (e.g., an incorrect database configuration) that have to be resolved before the database can be made accessible again.

SUMMARY

This specification describes systems, methods, and computer programs for upgrading data in databases. In general, implementations of the present disclosure minimize cost, risk and downtime resulting from a database upgrade process by upgrading current data first to bring the database back online without having to wait for all historical data to be upgraded. Risk can further be minimized by implementing a quality assured upgrade process that requires minimal change to be compatible with a separation of current data and historical data and that preserves verification steps to ensure that the database upgrade results in the correct database configuration.

Innovative aspects of the subject matter described in this specification may be embodied in methods for updating data within a database. In some implementations, methods include providing a plurality of cut-off dates, for each cut-off date in the plurality of cut-off dates determining a total time based on respective times associated with a plurality of tasks to provide a plurality of total times, each total time corresponding to a respective cut-off date, selecting an actual cut-off date based on the plurality of total times, and updating data within the database using the actual cut-off date. Other implementations of these aspects include corresponding systems, apparatus, and computer programs, configured to perform the actions of the methods, encoded on computer storage devices.

These and other embodiments may each optionally include one or more of the following features: the plurality of tasks includes a first task that includes moving data from being pre cut-off date data to being post cut-off date data, and a second task that includes updating the post cut-off date data; actions further include providing, for each cut-off date, a set of data entries that are to be moved based on the respective cut-off date; data entries in the set of data entries comprise data this is to be available for access after the respective cut-off date; the actual cut-off date is selected as the cut-off date that corresponds to the minimum total time of the total times provided in the plurality of total times; selecting the actual cut-off date includes modeling the respective times associated with the plurality of tasks to provide a plurality of models, and selecting the actual cut-off date using the plurality of models; the plurality of total times includes a first total time that is provided based on a first cut-off date of the plurality of cut-off dates, and a second total time that is provided based on a second cut-off date of the plurality of cut-off dates, the first total time being greater than the second total time; the first cut-off date is selected as the actual cut-off date; and updating data within the database includes: defining a first group of data within a first table based on the actual cut-off date, defining a second group of data within the first table based on the actual cut-off date, moving the second group of data to a second table, converting the first group of data from a first data structure to a second data structure to provide converted first data within the first table, making the converted first data available for access over a network, converting the second group of data from the first data structure to the second data structure to provide converted second data in the second table, and making the converted second data available for access over the network.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Implementations of the present disclosure are generally directed to updating data stored within a database, and include a database upgrade process that minimizes cost, risk and downtime. In some implementations, current data is upgraded first and is made accessible without waiting for historical data to be upgraded. Current data can include data that has been generated and/or stored to the database after a selected cut-off data and historical data can include data that has been generated and/or stored to the database on or before the selected cut-off date. In accordance with implementations of the present disclosure, and as described in further detail herein, the cut-off date is selected based on respective times associated with a plurality of tasks. Example tasks include moving data from pre cut-off date data to post cut-off date data, and updating post cut-off date data, which includes the moved data.

In some implementations, historical data is switched out of one or more database tables, and current data within the one or more database tables is upgraded. The database is brought online with the upgraded current data. In some implementations, the owner of the database can test the upgraded current data (e.g., to ensure that there are no failures and/or system crashes), and the database is brought online upon successful completion of the testing. The historical data is upgraded. In some implementations, upgrading of the historical data is initiated during testing of the upgraded current data. In some cases, upgrading of the historical data is completed before testing of the upgraded current data is complete. Upon upgrading the historical data, the historical data is switched back into the one or more database tables where current data resides.

Figure 1:
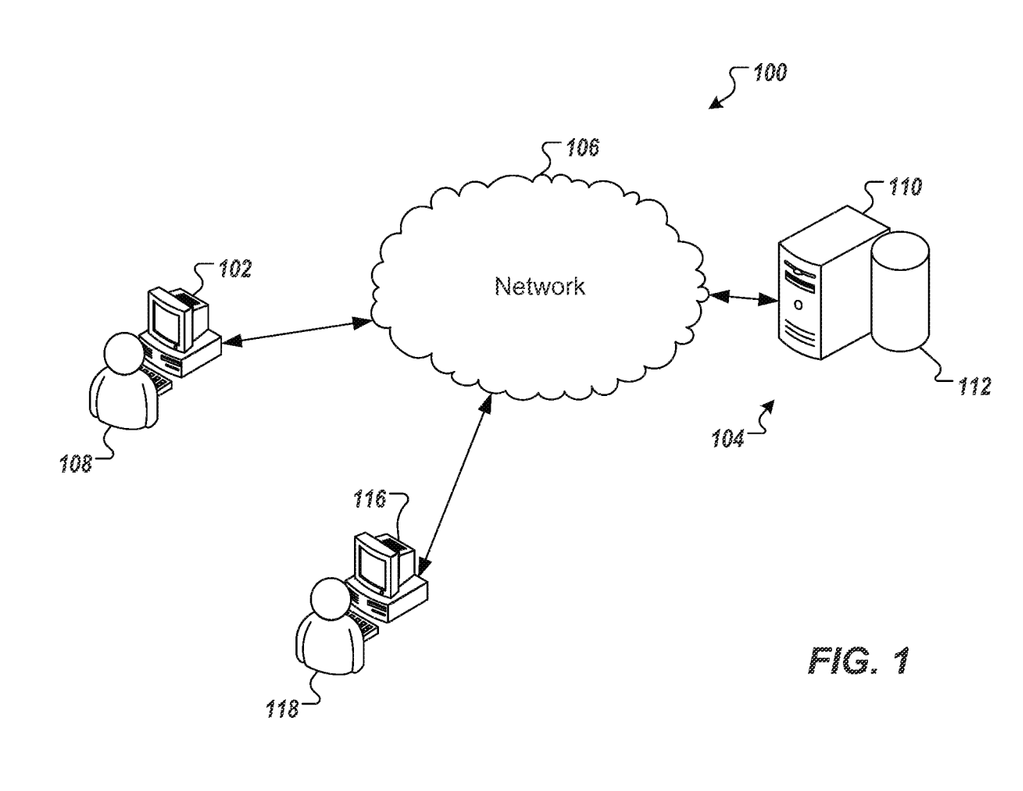
FIG. 1 depicts an example system that can execute implementations of the present disclosure.

FIG. 1 depicts an example system 100 that can be used to execute database updating in accordance with implementations of the present disclosure. The example system 100 includes a computing device 102 that communicates with one or more server systems 104 through one or more networks 106. The computing device 102 can include one or more of several types of computing devices. Example computing devices can include a desktop computer, a laptop computer, a smart phone, a personal digital assistant (PDA), a tablet computer, or any other suitable computer device. The computing device 102 can include one or more processors configured to execute instructions stored by a computer-readable medium for performing various device operations, such as input/output, communication, data processing, and the like.

The one or more server systems 104 can include one or more servers 110 (e.g., a server farm) including one or more processors configured to execute instructions stored by a computer-readable medium for performing various server operations. The one or more server systems 104 may also include one or more data stores 112 provided as computer-readable memory for storing data. The networks 106 can be provided as wired and/or wireless networks, and may include a packet-based network, such as a TCP-IP network. The networks 106 may include a local area network (e.g., an intranet), a wireless local area network (WLAN) or WiFi network, a Third Generation (3G) or Fourth Generation (4G) mobile telecommunications network, a wide area network, the Internet, or any appropriate combination thereof.

In general, the one or more server systems 104 can process and store data related to travel commerce in database form. Example data can include booking data associated with travel bookings. Example booking data can include, but is not limited to, transport reservation data (e.g., airline, train and/or boat reservation), hotel reservation data and/or car rental reservation data. The computing device 102 can be used by one or more users 108 to access travel commerce data in the database and/or to perform administration activities with the database. By way of non-limiting example, the user 108 can access the database using the computing device 102 to upgrade the data stored within the database in accordance with implementations of the present disclosure.

The example system 100 can further include one or more computing devices 116 that communicate with the one or more server systems 104 through the networks 106. The computing device 116 can include one or more of several types of computing devices. Example computing devices can include a desktop computer, a laptop computer, a smart phone, a personal digital assistant (PDA), a tablet computer, or any other suitable computer device. The computing device 116 can include one or more processors configured to execute instructions stored by a computer-readable medium for performing various device operations, such as input/output, communication, data processing, and the like.

In some implementations, a customer 118 can interact with a back-end application that is executed on the one or more servers 104. By way of non-limiting example, the customer 118 can include a traveler, or an intermediary for the traveler, such as a travel agent. The customer 118 can interact with the one or more servers 104 reserve or purchase a variety of travel services by accessing a travel commerce system, which in turn communicates with third parties that offer additional services (e.g., hotel rentals, car rentals, travel insurance, etc.). The example system 100 can be used to retrieve pricing and availability information from the third parties and transmit reservation and purchase requests for the additional travel services.

The example system 100 can generate transactional data and configuration data that is stored in a database of the one or more server systems 104. The transactional data can include sales data, orders data and booking data. Example booking data can include passenger name, a record locator number, the number of checked bags, an origin location, a destination location, special services requested, car rental data, hotel reservation data and the like. Example configuration data can include availability data, system settings and the like. The data can be stored in computer-readable memory and can be organized, or otherwise referenced using one or more tables. In some implementations, the tables can include partitions that further organize the underlying data. Example partitions can include time-based partitions (e.g., hourly, daily, weekly, monthly or yearly). A partitioning key can be provided that enables rapid inserts of data into the tables and that can be used to separate the data that should be upgraded immediately, as discussed in further detail herein. Generally, a partitioning key includes one or more columns that are used to determine the partition in which a particular row of data is stored.

The data stored in the database conforms to a data structure that is supported by the database. Periodically, the database may be upgraded to update the data structure of the underlying data to a newer version. For purposes of discussion, an example upgrade from version 1.0 to version 2.0 will be referenced herein. Accordingly, the underlying data structure may be converted from a first data structure to a second data structure. By way of non-limiting example, the data structure may by upgraded to add booking data (e.g., an amount charged for excess baggage), to delete booking data and/or to merge booking data. While the data is being upgraded, the database system is taken offline, during which time the data is not accessible. The upgrade processes of the present disclosure are transferrable from one database to another with minimal customization. For example, a file to manage disabling foreign key constraints is provided which can be used for any database. That is, the underlying code that can be used to execute the upgrade processes can be re-used across users, customers and different database systems.

Figure 2A:
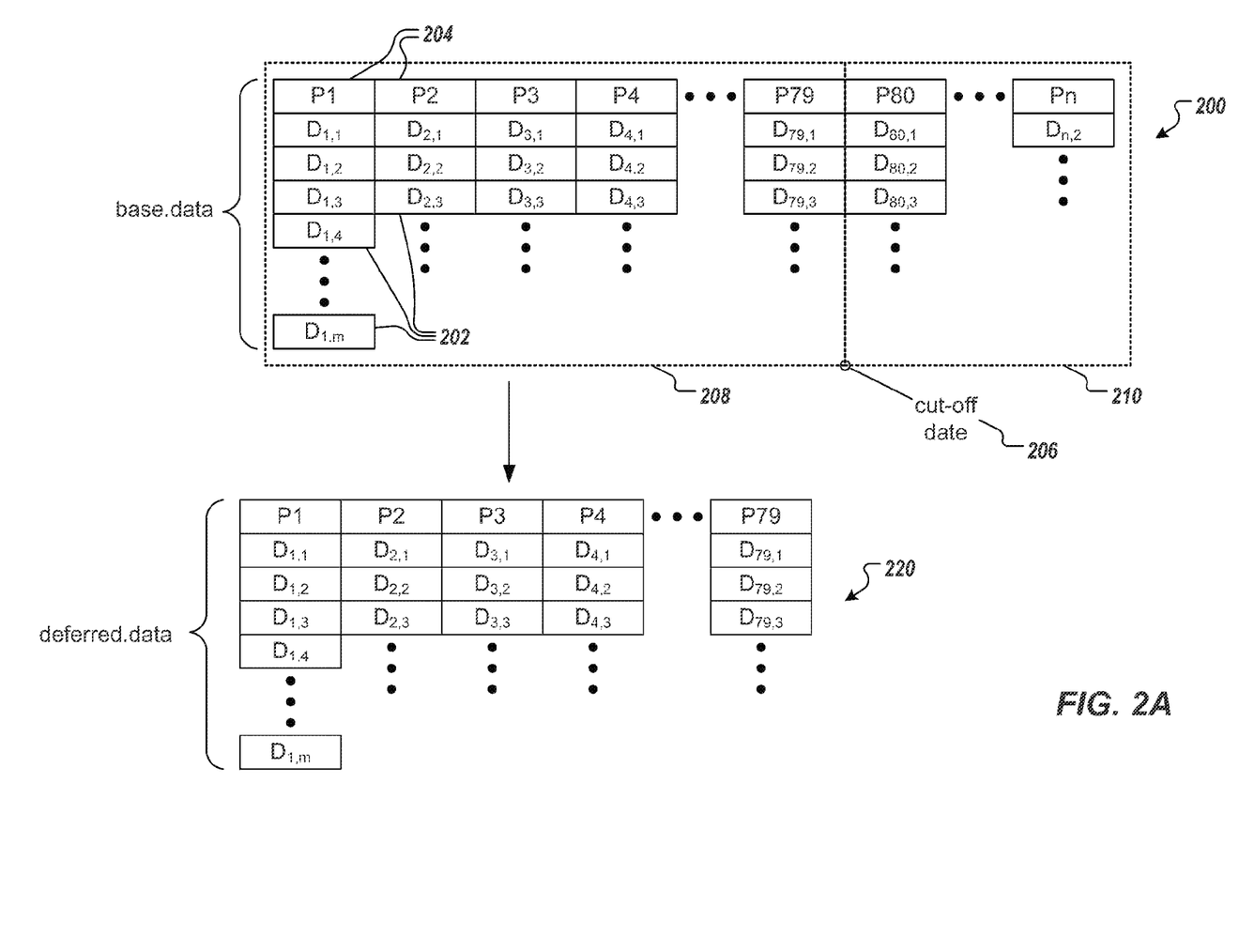
FIGS. 2A-2C depict data upgrading in accordance with implementations of the present disclosure.
Figure 2B:
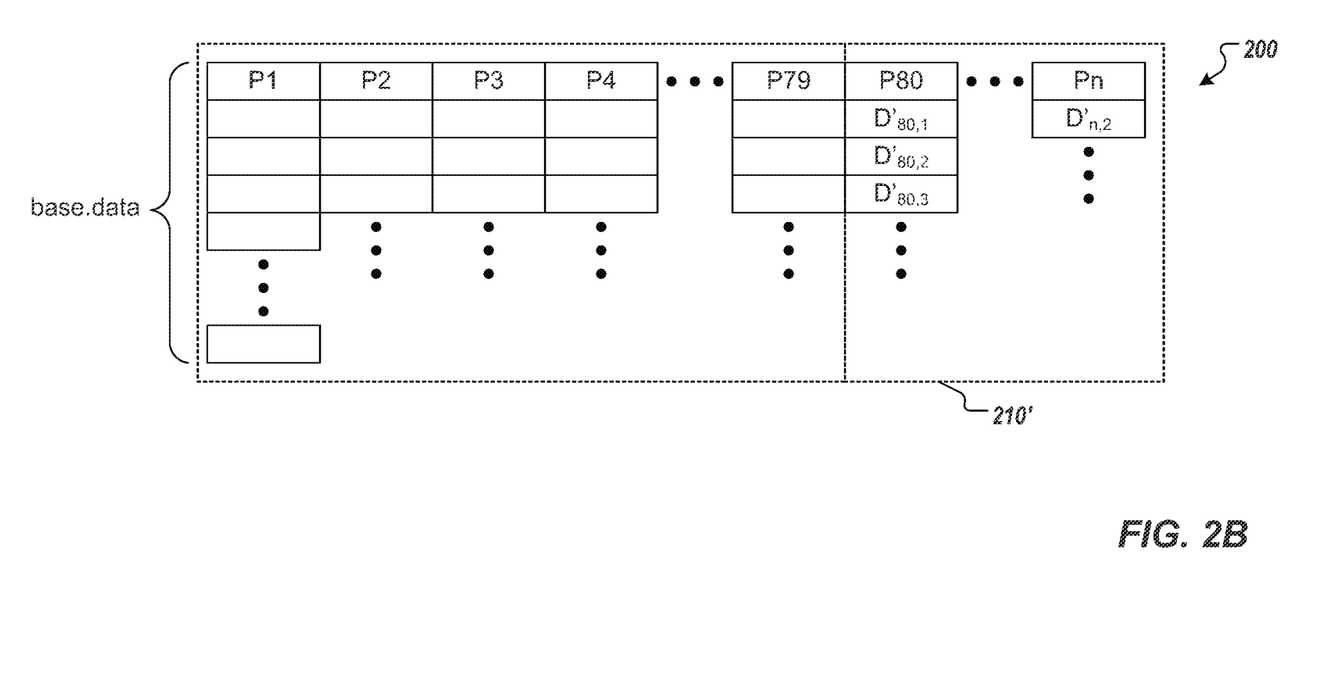
Figure 2C:
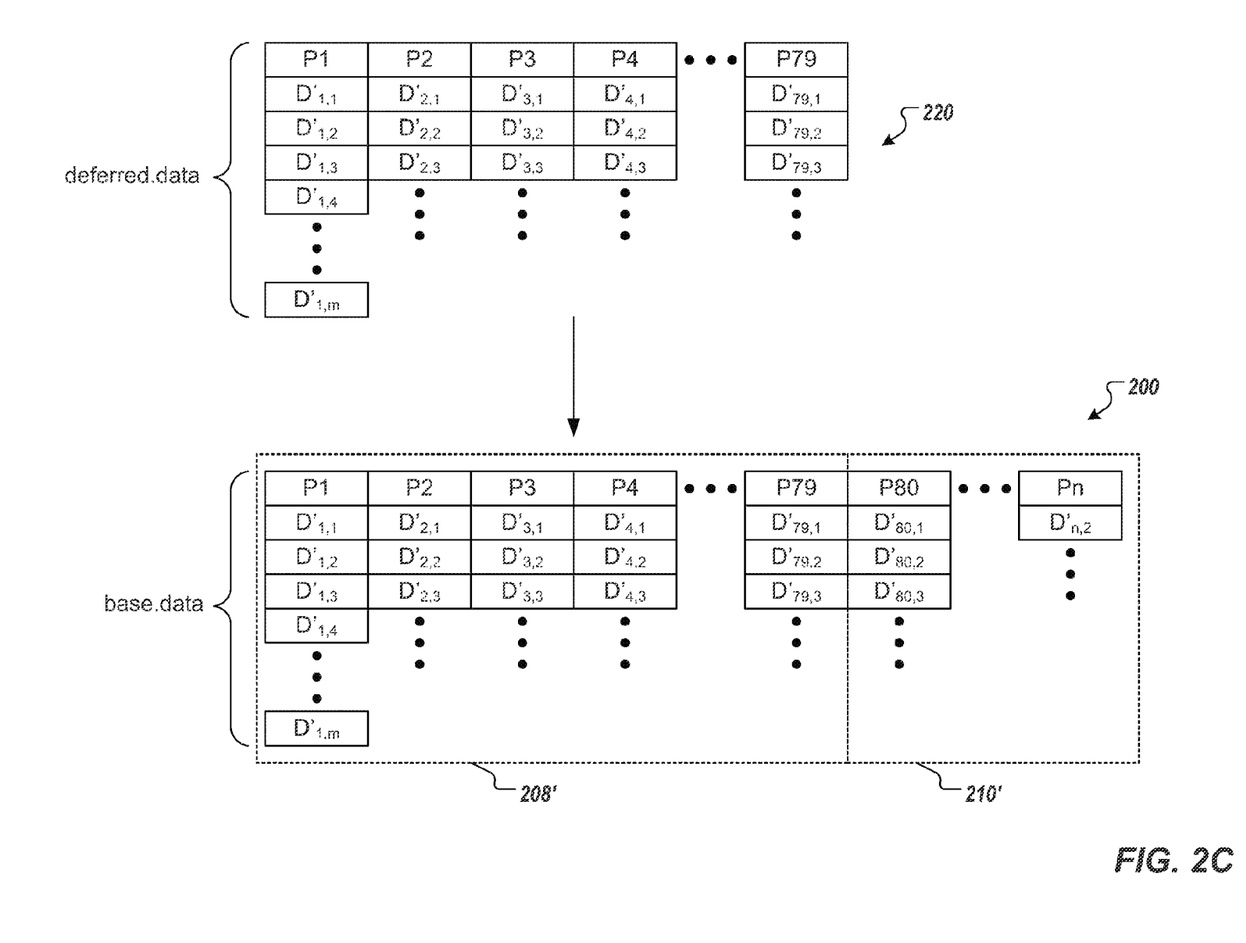

FIGS. 2A-2C depict data upgrading in accordance with some implementations. Referring now to FIG. 2A, an example database table 200 (base.data) is depicted. The database table 200 includes table entries 202 that are each populated with data (D). The data (D) can include transactional data. In the example database table 200, the database entries 202 are divided into partitions (P) 204. The example database table 200 includes partitions P1 to Pn. As discussed above, the partitions can be based on a time and/or date associated with the data (D), and can include hourly partitions, daily partitions, weekly partitions, monthly partitions or yearly partitions. By way of non-limiting example, and for discussion purposes, the partitions 204 can be provided as weekly partitions.

In accordance with implementations of the present disclosure, the data underlying the database table 200 is to be converted from a first data structure to a second data structure. For example, the first data structure can correspond to version 1.0 and the second data structure can correspond to version 2.0. A cut-off date 206 is determined. Implementations directed to determining the cut-off date 206 are described in further detail herein.

A partition corresponding to the cut-off date 206 is identified. In some implementations, the partition corresponding to the cut-off date can include a partition within which the cut-off date lies. In some implementations, the partition corresponding to the cut-off date can include a partition immediately following the partition within which the cut-off date lies. In some implementations, the partition corresponding to the cut-off date can include a partition immediately preceding the partition within which the cut-off date lies. Continuing with the non-limiting example above, all partitions that include data on or after 2011 Jun. 1, can be identified partitions as including post cut-off date data. For example, a weekly partition would include all days from Sunday through Saturday. Because June 1 falls on a Wednesday, the previous Tuesday and Sunday would be provided in the partition. Smaller partitions (e.g., daily) minimize the impact of this inadvertent inclusion.

In the example database table 200, the partition P79 corresponds to the cut-off date 206. Accordingly, data (D) in the partitions P1 to P79 is considered to be pre cut-off date data 208 and data (D) in the partitions P80 to Pn is considered to be post cut-off date data 210. The pre cut-off date data 208 is switched to another database table 220 (deferred.table). For example, a metadata operation can be performed to provide pointers to populate cells of the database table 220 with the data (D) of partitions P1 to P79. The metadata operation can also be performed to remove pointers such that the database table 200 is no longer populated with the data (D) of partitions P1 to P79. As discussed in further detail herein, conversion of the pre cut-off date data 208 is deferred.

Referring now to FIG. 2B, the post cut-off date data 210 is converted to provide converted post cut-off date data 210'. In some implementations, the data can be processed using standardized scripts (e.g., SQL scripts) that convert the data structure from version 1.0 to version 2.0. In some implementations, foreign key constraints are enabled based on system views and the list of tables for the transaction data package. By enabling the foreign key constraints before conversion, any potential problems where the scripts do not properly account for the required data relationships can be recognized. After conversion of the post cut-off date data, the database system is brought back online, such that the converted post cut-off date data 210' is available.

The pre cut-off date data 208 of the database table 220 is converted to provide converted pre cut-off date data 208'. In some implementations, the data can be processed using the standardized scripts that convert the data structure from version 1.0 to version 2.0. In some implementations, conversion of the pre cut-off date data 208 is deferred until after conversion of the post cut-off date data 210 is complete. In some implementations, conversion of the pre cut-off date data 208 can occur partially in parallel with conversion of the post cut-off date data 210. As discussed above, the amount of post cut-off date data can be significantly less than the amount of pre cut-off date data. Consequently, although conversion of the post cut-off date data and conversion of the pre cut-off date data can begin in parallel, conversion of the pre cut-off date data will be completed much sooner.

In some implementations, a menu item is provided in the install package to handle the upgrade of deferred data (i.e., the pre cut-off date data). When the menu item is selected, the data (D) recorded previously in the database table 220 can be displayed to a user performing the upgrade (e.g., user 108 of FIG. 1). In some implementations, different scripts can be used to convert the pre cut-off date data and the post cut-off date data of the different tables (e.g., base.data and deferred.data). In some implementations, the table names can be replaced with a variable (e.g., sqlcmd variable) when generating scripts to be applied during the upgrade. In this manner, the same scripts can be used to convert the pre cut-off date data and the post cut-off date data of the different tables (e.g., base.data and deferred.data). Further, a tool can be implemented to ensure that this variable is used in all scripts. By way of non-limiting example, the tool can implement the following scripting convention: [OriginalSchema].[TableName]. Generally, and in some implementations, conversion of the pre cut-off date data can include disabling foreign keys and running the upgrade scripts (e.g., with "deferred" as the TARGETSCHEMA sqlcmd variable). In some implementations, a schema compare routine may be forgone during execution of the upgrade process. For example, a schema compare routine may fail as a consequence of the deferred schema name. The schema will be assured to be identical at the end, because the partitions cannot be switched back to the database table 200 if it is not identical. Similarly, it could not have been switched out had the schema been different.

In some implementations, an upgrade can include a series of smaller, incremental upgrades. By way of non-limiting example, the upgrade can include a series of upgrades that go from version 1.0 to version 1.1, from version 1.1 to version 1.2, and from version 1.2 to version 2.0. After each of the smaller upgrades is performed, the database table 220 can be updated. In some instances, the user may want to pause the upgrade of the pre cut-off date data. For example, the database system may need to be brought back online before the upgrade is complete, or if the upgrade process is consuming significant system resources that may be required for normal production activity. The upgrade process can be stopped by the user (e.g., by clicking on a stop button provided in a user interface). If the upgrade process is in the middle of an incremental upgrade (e.g., from version 1.1 to version 1.2), the incremental upgrade is completed and the database table 220 is updated. The upgrade process can be subsequently re-started (e.g., by clicking on a run button in the user interface) to continue upgrading to version 2.0.

After conversion, the converted pre cut-off date data 208' is switched back to the database table 200. For example, a metadata operation can be performed to provide pointers to populate cells of the database table 200 with the converted data (D') of partitions P1 to P79. The metadata operation can also be performed to remove pointers such that the database table 220 is no longer populated with the data (D') of partitions P1 to P79. In some implementations, the metadata operation to change the pointers for P1 to P79 can be provided as a single step operation. For example, the metadata operation can begin with P1 to P79 pointed at the database table 200, and the operation changes the pointer to point P1 to P79 to the database table 220. Consequently, the converted pre cut-off date data 208' and the converted post cut-off date data 210' are both available and the conversion process is complete.

Figure 3:
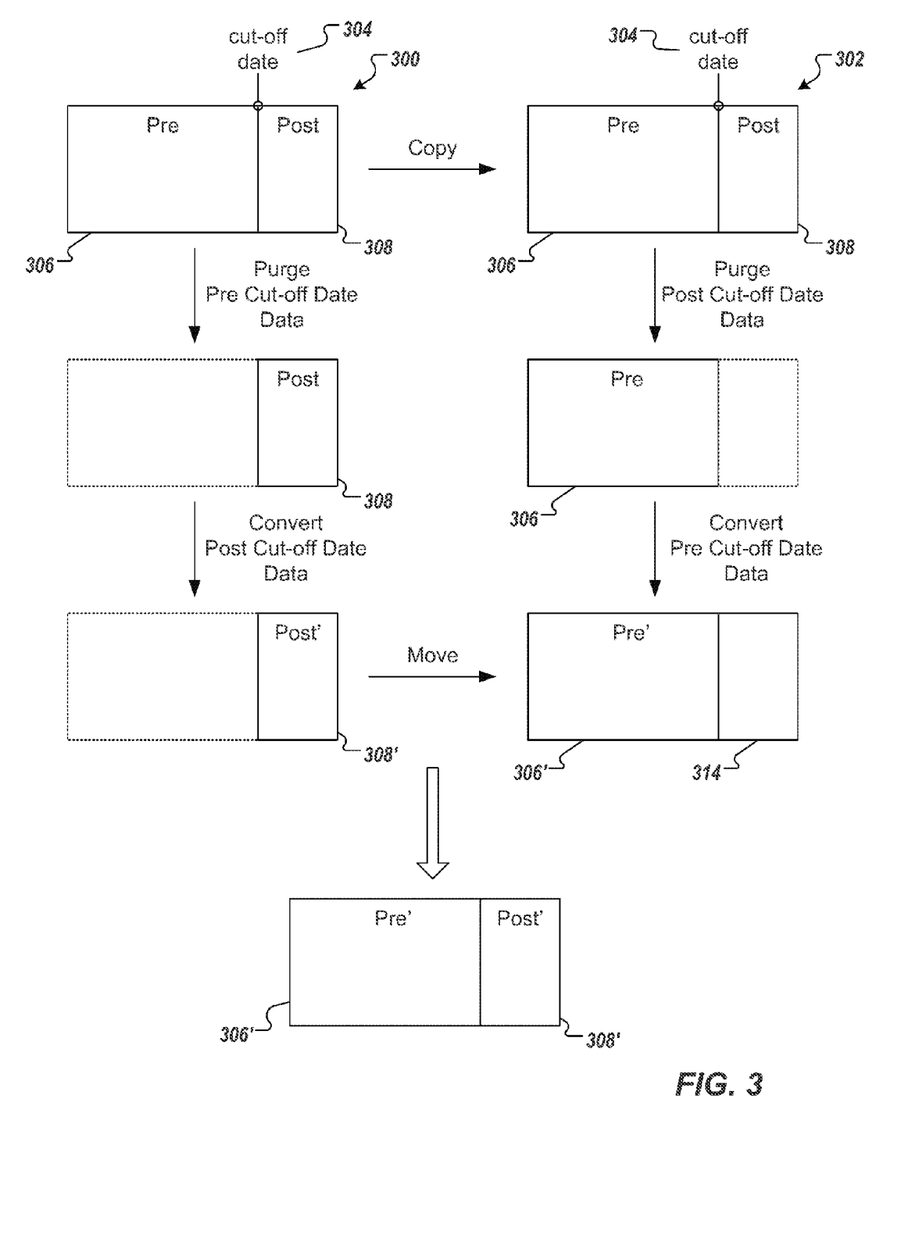
FIG. 3 depicts data upgrading in accordance with implementations of the present disclosure.

Referring now to FIG. 3, an original database 300 that includes to-be converted data might not include partitioned tables prior to execution of the conversion process. In some implementations, the original database 300 is copied to provide a copied database 302. A cut-off date 304 is determined and the data in each of the database tables 300, 302 is differentiated as either pre cut-off date data 306 or post cut-off date data 308.

The post cut-off date data 308 is purged from the copied database 302, leaving the pre cut-off date data 306. For example, post cut-off date data 308 of the copied database 302 can be deleted from computer-readable memory. The pre cut-off date data 306 is converted to provide converted pre cut-off date data 306' arranged in at least one partitioned table 312. In some implementations, the data can be processed using the standardized scripts that convert the data structure from version 1.0 to version 2.0. The partitioned table 312 can include reserved table entries 314.

The pre cut-off date data 306 is purged from the original database 300, leaving the post cut-off date data 308. For example, pre cut-off date data 306 of the original database 300 can be deleted from computer-readable memory. The post cut-off date data 308 is converted to provide converted post cut-off date data 308' arranged in at least one partitioned table 320. In some implementations, the data can be processed using the standardized scripts that convert the data structure from version 1.0 to version 2.0. The converted post cut-off date data 308' is moved to the copied database 302 and is entered into the reserved table entries 314 of the partitioned table 312. The database system is brought back online such that the converted pre cut-off date data 306' and the converted post cut-off date data 308' are available.

Figure 4:
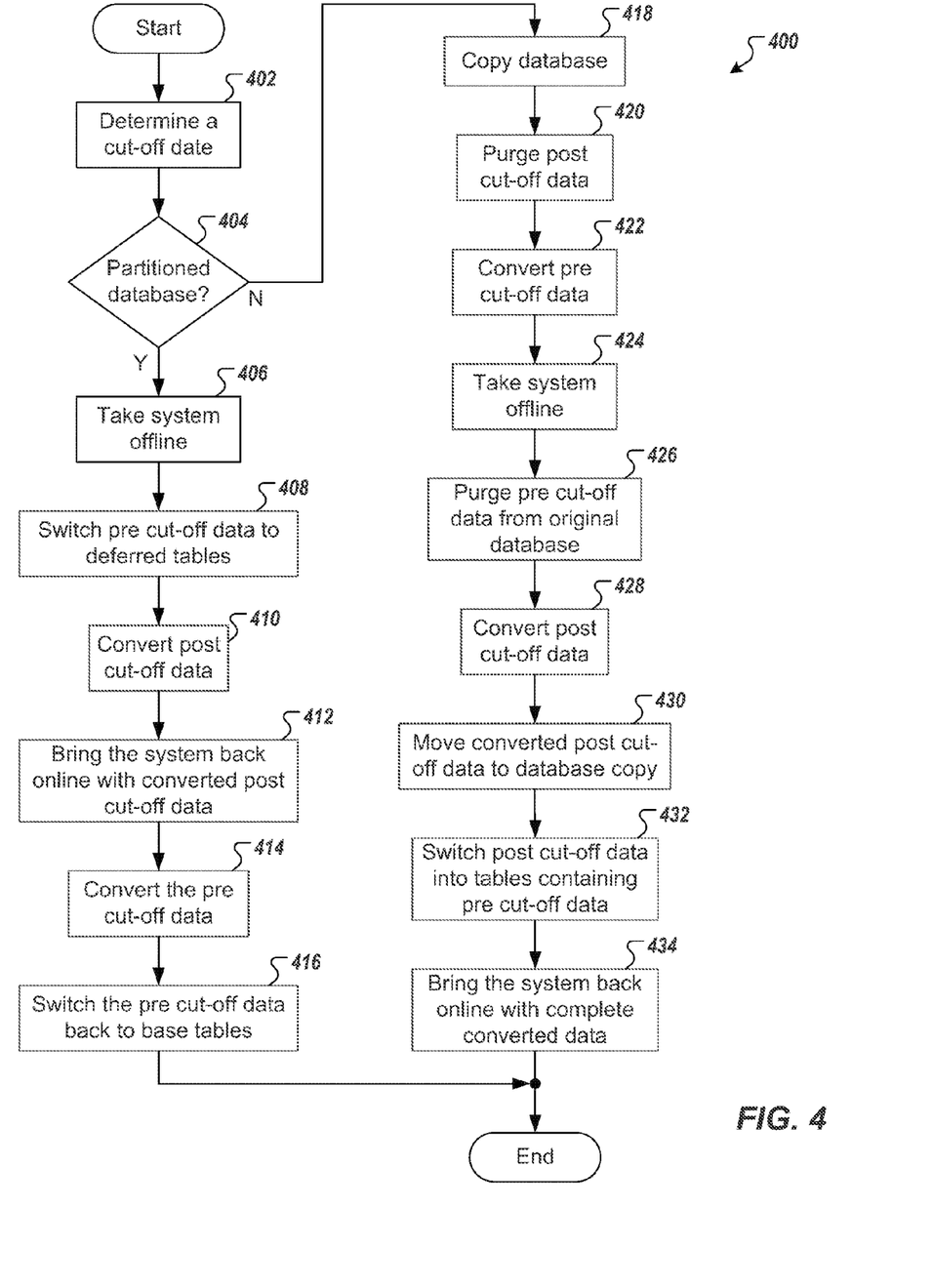
FIG. 4 depicts an example process that can be executed in accordance with implementations of the present disclosure.

FIG. 4 is a flowchart of an example process 400 that can be executed in accordance with implementations of the present disclosure. In some implementations, the process 400 may be performed by the system 100, and will be described as such for the purpose of clarity. A cut-off date is determined (402). For example, the cut-off date can be provided by an entity that owns the database. In some implementations, the cut-off date is determined as described below with reference to FIGS. 5-7. It is determined whether base database table(s) is (are) partitioned (404). If the base database table(s) is (are) partitioned, the database system is taken offline (406). Pre cut-off date data in the base database table(s) is switched to a deferred table(s) (408). For example, and as discussed above, a metadata operation can be provided to change data pointers.

Post cut-off date data is converted (410). For example, and as discussed above, the post cut-off date data is processed to convert the data from a first data structure to a second data structure. The database system is brought back online making the converted post cut-off date data available (412). The pre cut-off date data is converted (414). For example, and as discussed above, the pre cut-off data is processed to convert the data from the first data structure to the second data structure. The converted pre cut-off data is switched back to the base table(s) (416). For example, and as discussed above, a metadata operation can be provided to change data pointers.

If the database table(s) is (are) partitioned, the database is copied (418). For example, the data of the database is replicated and stored in computer-readable memory. Post cut-off date data is purged from the copied database (420). For example, post cut-off date data can be deleted from computer-readable memory. Pre cut-off date data of the copied database is converted (422). For example, and as discussed above, the pre cut-off data is processed to convert the data from the first data structure to the second data structure. The database system is taken offline (424). The pre cut-off data is purged from the original database (426). For example, pre cut-off date data can be deleted from computer-readable memory.

The post cut-off date data is converted (428). For example, and as discussed above, the post cut-off date data is processed to convert the data from the first data structure to the second data structure. The converted post cut-off date data is moved from the original database to the copied database (430). In some implementations, the converted post cut-off date data is copied to computer-readable memory associated with the copied database and is deleted from computer-readable memory associated with the original database. The converted post cut-off date data is switched into tables containing the converted pre cut-off date data (432). The database system is brought online (434) such that the converted data is accessible from the copied database.

Figure 5:
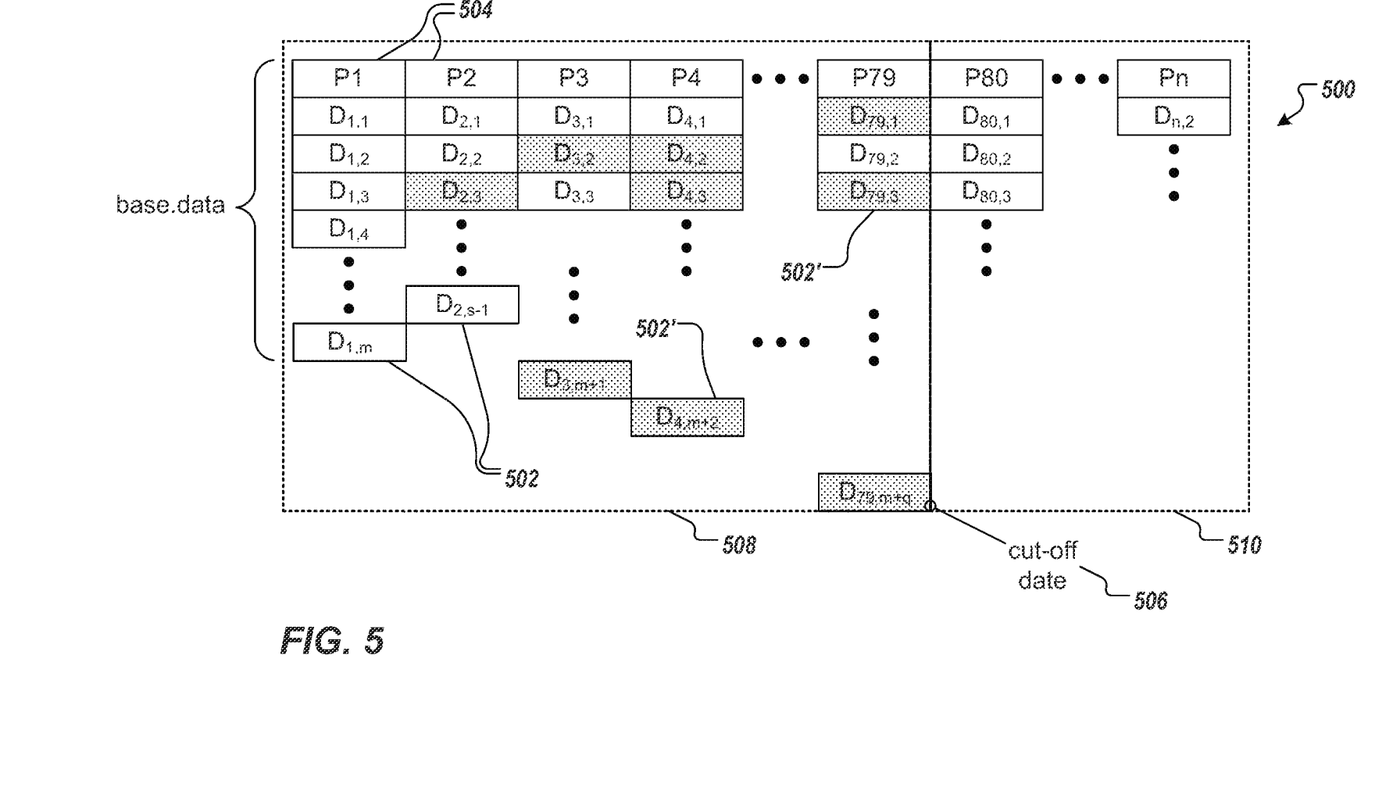
FIG. 5 depicts example selection of a cut-off date in accordance with implementations of the present disclosure

FIG. 5 depicts an example database table 500 (base.data). The database table 500 includes table entries 502 that are each populated with data (D). The data (D) can include transactional data. In the example database table 500, the database entries 502 are divided into partitions (P) 504. The example database table 500 includes partitions P1 to Pn. As discussed above, the partitions can be based on a time and/or date associated with the data (D), and can include hourly partitions, daily partitions, weekly partitions, monthly partitions or yearly partitions. By way of non-limiting example, and for discussion purposes, the partitions 504 can be provided as weekly partitions. In some examples, entries 502 are assigned to a respective partition 504 based on the date that the entry was created. For example, an entry 502 can include data associated with a booking/reservation on a travel conveyance, e.g., a flight, and can be assigned to a respective partition based on the date that the booking/reservation was created.

In accordance with implementations of the present disclosure, the data underlying the database table 500 is to be converted from a first data structure to a second data structure. For example, the first data structure can correspond to version 1.0 and the second data structure can correspond to version 2.0. An initial cut-off date 506 is determined. In some implementations, and as described in further detail herein, the cut-off date 506 is selected as an initial cut-off date, and an actual cut-off date is provided based on minimizing time required to execute one or more tasks.

A partition corresponding to the cut-off date 506 is identified. In some implementations, the partition corresponding to the cut-off date can include a partition within which the cut-off date lies. In some implementations, the partition corresponding to the cut-off date can include a partition immediately following the partition within which the cut-off date lies. In some implementations, the partition corresponding to the cut-off date can include a partition immediately preceding the partition within which the cut-off date lies. Continuing with the non-limiting example above, all partitions that include data on or after 2011 Jun. 1, can be identified partitions as including post cut-off date data. For example, a weekly partition would include all days from Sunday through Saturday. Because June 1 falls on a Wednesday, the previous Tuesday and Sunday would be provided in the partition. Smaller partitions (e.g., daily) minimize the impact of this inadvertent inclusion.

In the example database table 500, the partition P79 corresponds to the initial cut-off date 506. Accordingly, data (D) in the partitions P1 to P79 is considered to be pre cut-off date data 508 and data (D) in the partitions P80 to Pn is considered to be post cut-off date data 510.

In accordance with implementations of the present disclosure, it can be determined that data in particular data entries 502 of the pre cut-off date data 508 need to be updated with the post cut-off date data 510. In the example of FIG. 5, shaded data entries 502' indicate pre cut-off date data that must be available with the first group of data that will be upgraded, i.e., the post cut-off date data 510. Continuing with the example above, data entries 502, 502' can include data associated with a booking/reservation on a travel conveyance, e.g., a flight, and can be assigned to a respective partition 504 based on the date that the booking/reservation was created. It can be determined, however, that the data in the data entries 502' include travel booking/reservation data for travel that is to occur on or after the cut-off date 506. For example, entries 502' can each include a parameter indicating a date on or after the cut-off date 506. Consequently, data in the data entries 502' must be upgraded and be available for a traveler checking in, e.g., for a flight in this example, along with the post cut-off date data 510. In accordance with implementations of the present disclosure, the data in the data entries 502' is moved to partitions in the post cut-off date data 510.

In some implementations, an actual cut-off date can be determined based on the initial cut-off date 506 and the total time required to execute a plurality of tasks. In some examples, a first task includes moving data that is in the pre cut-off date data 508, but is needed in the post cut-off date data 510, e.g., data in the shaded entries 502', to partitions in the post cut-off date data. The first task is associated with a first time ($t_{move}$), which includes the time required to move the data. In some examples, a second task includes updating the data provided in the post cut-off date data 510. The second task is associated with a second time ($t_{update}$), which includes the time required to update the data. A total time ($t_{total}$) can be provided, which include the sum of $t_{move}$ and $t_{update}$. Accordingly, $t_{total}$ is the total time required to move data entries 502' from the pre cut-off date data 508 to the post cut-off date data 510, and to update the data in the post cut-off date data 510, which includes the moved entries 502'.

The first time and the second time are both influenced by the cut-off date 506. For example, in the example of FIG. 5, at least nine shaded data entries 502' are provided based on the cut-off date 506. Consequently, the at least nine shaded data entries 502' would need to be moved, which move process requires $t_{move1}$. Also, the time required to update the data provided in the post cut-off date data 510, which would also include the at least nine shaded data entries 502' that were moved, is $t_{update1}$.

However, if the cut-off date were changed to be just before the partition P79, all of the data in partition P79 would be included in the post cut-off date data 510. Consequently, at least six shaded data entries 502' would need to be moved, which move process requires $t_{move2}$. In this example, the number of shaded data entries 502' is decreased by at least three, because the data entries of partition P79 are now already included in the post cut-off date data 510, and would no longer need to be moved. Consequently, it can be provided that $t_{move1}$ is greater than $t_{move2}$. However, because all $t_{move1}$ is of the data entries of partition P79 are now included in the post cut-off date data 510, a time $t_{update2}$ would be required to update the data, which also includes the at least six shaded data entries 502' that would need to be moved. Consequently, it can be provided that $t_{update2}$ is greater than $t_{update1}$. Accordingly, by moving) the cut-off date further back in time (e.g., to the left in the orientation of FIG. 5), $t_{move}$, i.e., the time required to move data from the pre-cut-off date data 508 to the post cut-off date data 510, decreases, but $t_{update}$, i.e., the time required to update the post cut-off date data 510, increases.

As another example, if the cut-off date were changed to be just after the partition P80, at least nine shaded data entries 502' would need to be moved, which move process requires $t_{move3}$. It can be the case, however, that there may be data entries 502' in the partition P80 that would also have to be moved to the post cut-off date data 510. Consequently, $t_{move3}$ could be greater than $t_{move1}$. In this example, because only the data entries of partition P81 to Pn are now included in the post cut-off date data 510, a time $t_{update3}$ would be required to update the data, which also includes the at least six shaded data entries 502' and any entries 502' in partition P80 that would need to be moved. Consequently, it can be provided that $t_{update3}$ is less than $t_{update1}$. Accordingly, by moving the cut-off date forward in time (e.g., to the right in the orientation of FIG. 5), $t_{move}$, i.e., the time required to move data from the pre-cut-off date data 508 to the post cut-off date data 510, increases, but $t_{update}$, i.e., the time required to update the post cut-off date data 510, decreases.

Figure 6:
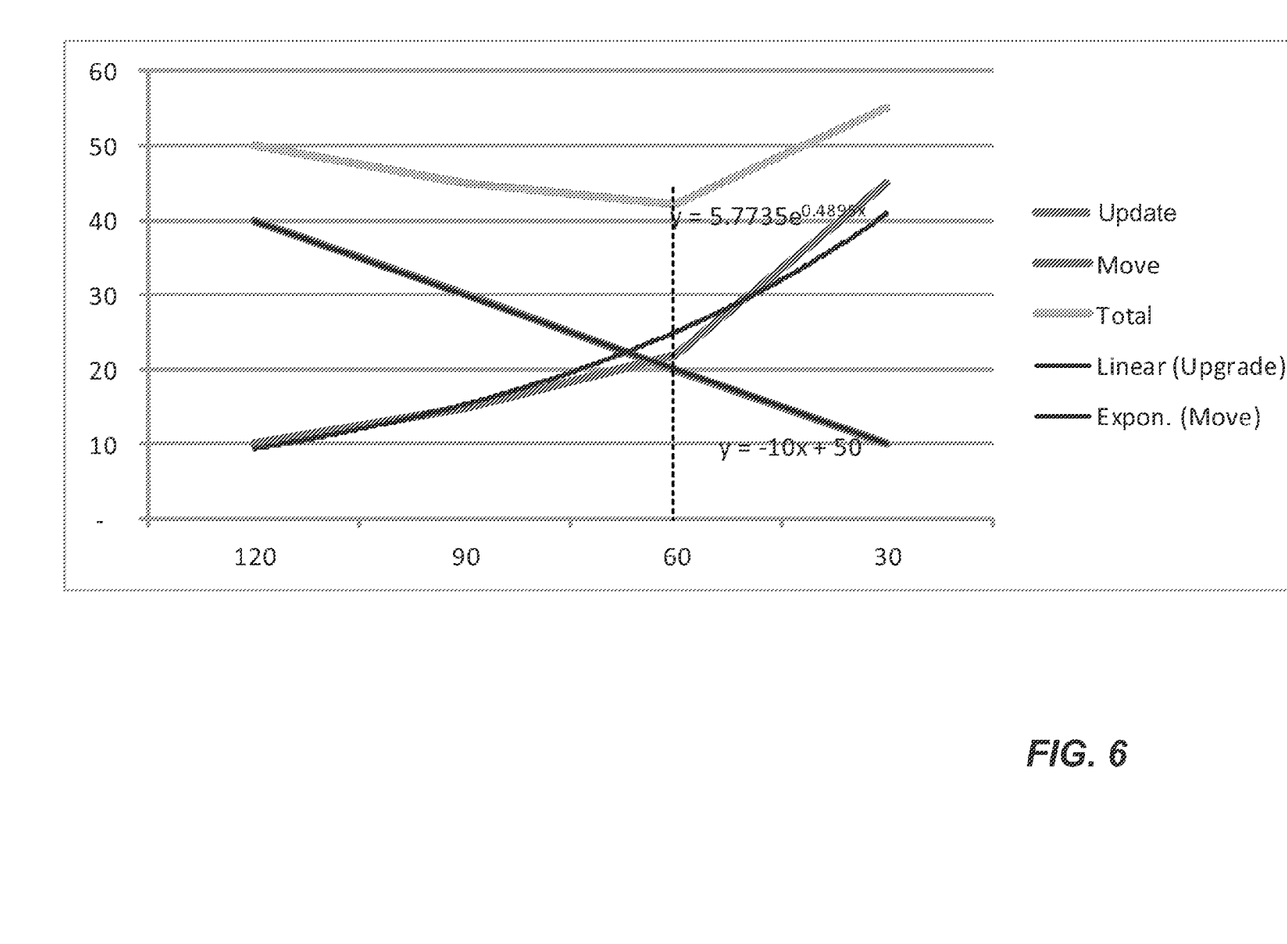
FIG. 6 depicts an example modeling for determining an actual cut-off date in accordance with implementations of the present disclosure.

Implementations of the present disclosure are directed to determining an actual cut-off date based on minimizing $t_{total}$. In some examples, the actual cut-off date is selected based on minimizing $t_{move}$ and $t_{update}$ to provide a minimized $t_{total}$. In some examples, the cut-off date can be moved until $t_{total}$ is below a threshold time ($t_{thr}$). In some examples, the cut-off date can be moved a threshold number of times to provide a plurality of data points for each of $t_{move}$ and $t_{update}$. In some examples, each of $t_{move}$ and $t_{update}$ can be modeled with respect to the cut-off date (e.g., using curve fitting) and the actual cut-off date can be determined based on a curve that models $t_{total}$ (e.g., a minimum value for $t_{total}$ along the curve), which can be provided based on the curve that models $t_{move}$ and the curve that models $t_{update}$. FIG. 6 depicts an example modeling for determining the actual cut-off date. In some examples, the cut-off date can be moved a threshold number of times to provide a plurality of data points for $t_{update}$ and the actual cut-off date can be determined based on the minimum value of $t_{update}$ across the plurality of data points. In some examples, two or more of the above-described examples can be combined to determine the actual cut-off date. Once the actual cut-off date is determined, the actual cut-off date is used to define the pre cut-off date data and the post cut-off date data for updating the data as described herein.

Figure 7:
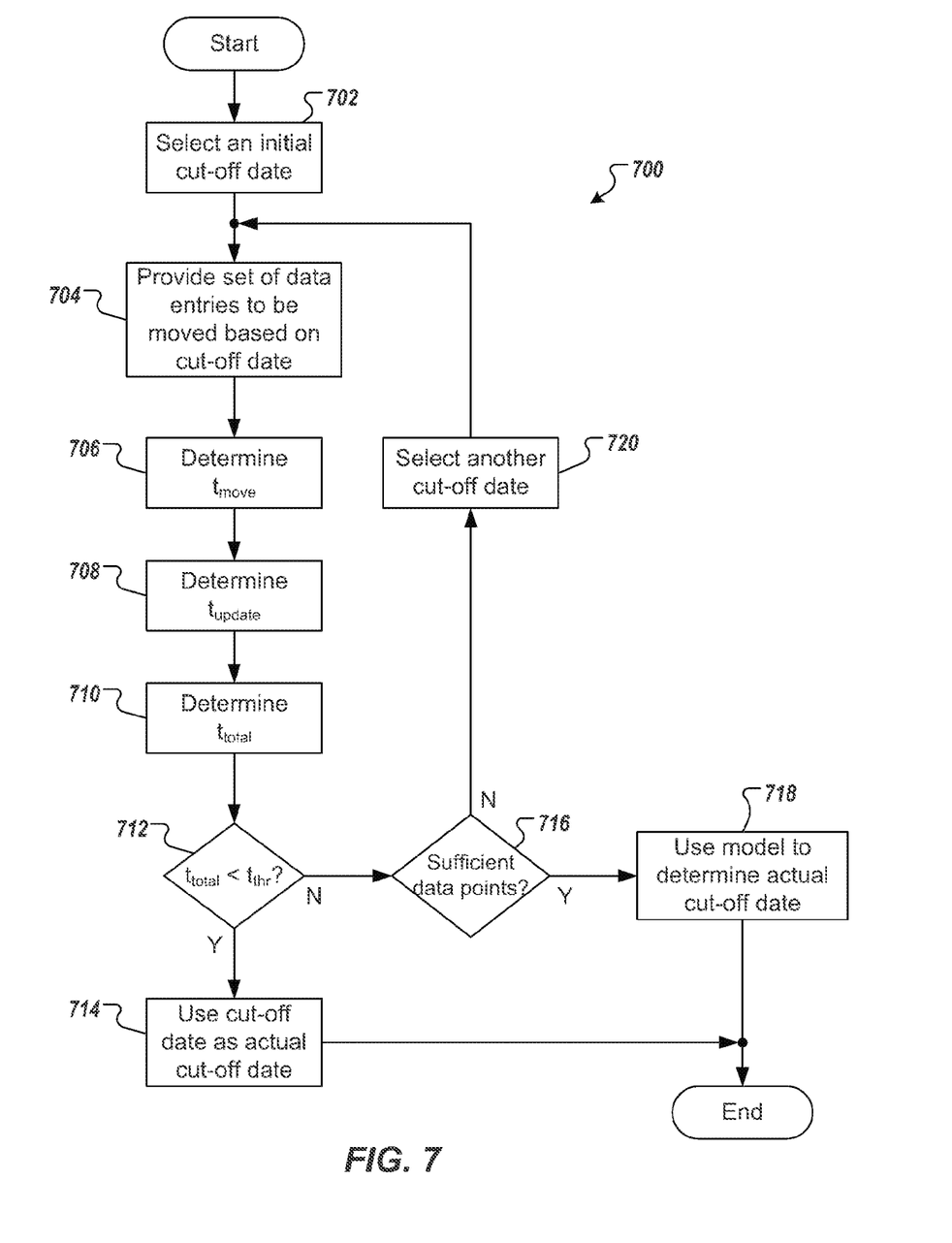
FIG. 7 depicts an example process that can be executed to determine an actual cut-off date in accordance with implementations of the present disclosure.

FIG. 7 depicts an example process 700 that can be executed to determine an actual cut-off date in accordance with implementations of the present disclosure. In some implementations, the process 700 may be performed by the system 100, and will be described as such for the purpose of clarity. An initial cut-off date is selected (702). For example, the cut-off date can be provided by an entity that owns the database, e.g., can be input by an operator. A set of data entries that are to be moved is provided based on the cut-off date (704). For example, pre cut-off date data can be reviewed to identify data entries, e.g., data entries 502' of FIG. 5, that are to be moved to the pre cut-off date data. A move time ($t_{move}$) is determined (706). For example, $t_{move}$ is determined based on the number of data entries in the set of data entries that are to be moved. An update time ($t_{update}$) is determined (708). For example, $t_{update}$ is determined based on the number of data entries in the post cut-off date data, including the data entries in the set of data entries that are to be moved. A total time ($t_{total}$) is determined (710). For example, $t_{total}$ is determined as the sum of $t_{move}$ and $t_{update}$.

It is determined whether $t_{total}$ is less than a threshold time ($t_{thr}$) (712). If $t_{total}$ is less than $t_{thr}$, the cut-off date is selected as the actual cut-off date (714). If $t_{total}$ is not less than $t_{thr}$, it is determined whether a sufficient number of data points are available (716). For example, it is determined whether a sufficient number data points (e.g., three or more data points) for $t_{move}$ and $t_{update}$ are available to model each based on cut-off date (e.g., using curve fitting). If a sufficient number of data points are available, models are used to determine the actual cut-off date (718). For example, each of $t_{move}$ and $t_{update}$ can be modeled with respect to the cut-off date (e.g., using curve fitting) and the actual cut-off date can be determined based on a curve that models $t_{total}$ (e.g., a minimum value for $t_{total}$ along the curve), which can be provided based on the curve that models $t_{move}$ and the curve that models $t_{update}$. If a sufficient number of data points are not available, another cut-off date is selected (720), and the process 700 loops back.

Implementations of the present disclosure can be used to realize one or more of the following advantages. A quality assured certified package for production upgrades can be implemented to reduce risk (e.g., the correct database configuration results) and effort (e.g., time and cost). In some estimations, the time required to perform upgrades can be reduced by 90 to 95 percent (e.g., by only requiring upgrade of the current data before bringing the database system back online). In accordance with some implementations, minimal change is required to be compatible with a separation of current and historical data, and verification steps are preserved that ensure the correct database configuration is achieved. Cost is also reduced by implementing standardized coding across a broad range of customers (i.e., avoiding the need to create customized database code to support a small number of customers). Management and support costs are also reduced through the standardized process, which eliminates the need for customized procedures. Downtime of the database system is also minimized. For example, customers are willing to wait for access to historical data if they are able to access current data that is upgraded and available in a short period of time. By limiting the data that must be upgraded before getting the database system back online, the downtime of the database system is reduced.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for updating data within a database, the method being executed by one or more processors and comprising:
    providing a plurality of cut-off dates, each cut-off date defining a first portion of the data within the database as pre cut-off date data and a second portion of the data within the database as post cut-off date data;
    for each cut-off date in the plurality of cut-off dates determining, by the one or more processors, a plurality of tasks associated with updating the data within the database, each plurality of tasks corresponding to a respective cut-off date;
    providing a plurality of total times by, for each cut-off date in the plurality of cut-off dates determining, by the one or more processors, a total time based on respective times associated with each task of the corresponding plurality of tasks to provide the total time to execute the plurality of tasks corresponding to the respective cut-off date;
    selecting, by the one or more processors, an actual cut-off date based on the plurality of total times; and
    updating, by the one or more processors, the data within the database using the actual cut-off date to define the first portion and the second portion of the data within the database.

2. The method of claim 1, wherein at least one of the pluralities of tasks comprises a first task that includes moving data from being pre cut-off date data to being post cut-off date data, and a second task that includes updating the post cut-off date data.

3. The method of claim 2, further comprising providing, for each cut-off date, a set of data entries that are to be moved based on the respective cut-off date.

4. The method of claim 3, wherein data entries in the set of data entries comprise data that is to be available for access after the respective cut-off date.

5. The method of claim 1, wherein the actual cut-off date is selected as the cut-off date that corresponds to the minimum total time of the total times provided in the plurality of total times.

6. The method of claim 1, wherein selecting the actual cut-off date comprises modeling the respective times associated with each of the pluralities of tasks to provide a plurality of models, and selecting the actual cut-off date using the plurality of models.

7. The method of claim 1, wherein the plurality of total times comprises a first total time that is provided based on a first cut-off date of the plurality of cut-off dates, and a second total time that is provided based on a second cut-off date of the plurality of cut-off dates, the first total time being greater than the second total time.

8. The method of claim 7, wherein the first cut-off date is selected as the actual cut-off date.

9. The method of claim 1, wherein updating data within the database comprises:
    defining a first group of data within a first table based on the actual cut-off date;
    defining a second group of data within the first table based on the actual cut-off date;
    moving the second group of data to a second table;
    converting the first group of data from a first data structure to a second data structure to provide converted first data within the first table;
    making the converted first data available for access over a network;
    converting the second group of data from the first data structure to the second data structure to provide converted second data in the second table; and
    making the converted second data available for access over the network.

10. A system comprising:
one or more computers; and
a computer-readable medium coupled to the one or more computers having instructions stored thereon which, when executed by the one or more computers, cause the one or more computers to perform operations for updating data within a database, the operations comprising:
    providing a plurality of cut-off dates, each cut-off date defining a first portion of the data within the database as pre cut-off date data and a second portion of the data within the database as post cut-off date data;
    for each cut-off date in the plurality of cut-off dates determining, by the one or more computers, a plurality of tasks associated with updating the data within the database, each plurality of tasks corresponding to a respective cut-off date;
    providing a plurality of total times by, for each cut-off date in the plurality of cut-off dates, determining a total time based on respective times associated with each task of the corresponding plurality of tasks to provide the total time corresponding to the respective cut-off date;
    selecting an actual cut-off date based on the plurality of total times; and
    updating the data within the database using the actual cut-off date to define the first portion and the second portion of the data within the database.

11. The system of claim 10, wherein at least one of the pluralities of tasks comprises a first task that includes moving data from being pre cut-off date data to being post cut-off date data, and a second task that includes updating the post cut-off date data.

12. The system of claim 11, wherein the operations further comprise providing, for each cut-off date, a set of data entries that are to be moved based on the respective cut-off date.

13. The system of claim 12, wherein data entries in the set of data entries comprise data that is to be available for access after the respective cut-off date.

14. The system of claim 10, wherein the actual cut-off date is selected as the cut-off date that corresponds to the minimum total time of the total times provided in the plurality of total times.

15. The system of claim 10, wherein selecting the actual cut-off date comprises modeling the respective times associated with each of the pluralities of tasks to provide a plurality of models, and selecting the actual cut-off date using the plurality of models.

16. The system of claim 10, wherein the plurality of total times comprises a first total time that is provided based on a first cut-off date of the plurality of cut-off dates, and a second total time that is provided based on a second cut-off date of the plurality of cut-off dates, the first total time being greater than the second total time.

17. The system of claim 16, wherein the first cut-off date is selected as the actual cut-off date.

18. The system of claim 10, wherein updating data within the database comprises:
    defining a first group of data within a first table based on the actual cut-off date;
    defining a second group of data within the first table based on the actual cut-off date;
    moving the second group of data to a second table;
    converting the first group of data from a first data structure to a second data structure to provide converted first data within the first table;
    making the converted first data available for access over a network;
    converting the second group of data from the first data structure to the second data structure to provide converted second data in the second table; and
    making the converted second data available for access over the network.

19. A non-transitory computer storage medium encoded with a computer program, the program comprising instructions that when executed by one or more computers cause the one or more computers to perform operations for updating data within a database, the operations comprising:
    providing a plurality of cut-off dates, each cut-off date defining a first portion of the data within the database as pre cut-off date data and a second portion of the data within the database as post cut-off date data;
    for each cut-off date in the plurality of cut-off dates determining, by the one or more computers, a plurality of tasks associated with updating the data within the database, each plurality of tasks corresponding to a respective cut-off date;
    providing a plurality of total times by, for each cut-off date in the plurality of cut-off dates, determining a total time based on respective times associated with each task of the corresponding plurality of tasks to provide the total time to execute the plurality of tasks corresponding to the respective cut-off date;
    selecting an actual cut-off date based on the plurality of total times; and
    updating data within the database using the actual cut-off date to define the first portion and the second portion of the data within the database.

20. The non-transitory computer storage medium of claim 19, wherein at least one of the pluralities of tasks comprises a first task that includes moving data from being pre cut-off date data to being post cut-off date data, and a second task that includes updating the post cut-off date data.

21. The non-transitory computer storage medium of claim 20, wherein the operations further comprise providing, for each cut-off date, a set of data entries that are to be moved based on the respective cut-off date.

22. The non-transitory computer storage medium of claim 21, wherein data entries in the set of data entries comprise data that is to be available for access after the respective cut-off date.

23. The non-transitory computer storage medium of claim 19, wherein the actual cut-off date is selected as the cut-off date that corresponds to the minimum total time of the total times provided in the plurality of total times.

24. The non-transitory computer storage medium of claim 19, wherein selecting the actual cut-off date comprises modeling the respective times associated with each of the pluralities of tasks to provide a plurality of models, and selecting the actual cut-off date using the plurality of models.

25. The non-transitory computer storage medium of claim 19, wherein the plurality of total times comprises a first total time that is provided based on a first cut-off date of the plurality of cut-off dates, and a second total time that is provided based on a second cut-off date of the plurality of cut-off dates, the first total time being greater than the second total time.

26. The non-transitory computer storage medium of claim 25, wherein the first cut-off date is selected as the actual cut-off date.

27. The non-transitory computer storage medium of claim 19, wherein updating data within the database comprises:
    defining a first group of data within a first table based on the actual cut-off date;
    defining a second group of data within the first table based on the actual cut-off date;
    moving the second group of data to a second table;
    converting the first group of data from a first data structure to a second data structure to provide converted first data within the first table;
    making the converted first data available for access over a network;
    converting the second group of data from the first data structure to the second data structure to provide converted second data in the second table; and
    making the converted second data available for access over the network.

* * * * *